(12) United States Patent
Nakamura

(10) Patent No.: US 8,240,442 B2
(45) Date of Patent: Aug. 14, 2012

(54) LOCK-UP DEVICE

(75) Inventor: Takeyuki Nakamura, Moriguchi (JP)

(73) Assignee: EXEDY Corporation, Osaka (JP)

( * ) Notice: Subject to any disclaimer, the term of this patent is extended or adjusted under 35 U.S.C. 154(b) by 686 days.

(21) Appl. No.: 12/353,161

(22) Filed: Jan. 13, 2009

(65) Prior Publication Data

US 2009/0183962 A1 Jul. 23, 2009

(30) Foreign Application Priority Data

Jan. 18, 2008 (JP) ................................. 2008-009631

(51) Int. Cl.
*F16H 45/02* (2006.01)
(52) U.S. Cl. .................. 192/3.29; 192/213.1; 192/213.2
(58) Field of Classification Search ................. 192/3.29, 192/3.3, 212, 213, 213.1, 213.2; 464/67.1, 464/68.7, 68.8, 68.1
See application file for complete search history.

(56) References Cited

U.S. PATENT DOCUMENTS

| 4,240,532 | A | * | 12/1980 | Blomquist | |
|---|---|---|---|---|---|
| 5,477,950 | A | * | 12/1995 | Maloof | 192/3.29 |
| 5,655,635 | A | * | 8/1997 | Yuergens et al. | 192/3.29 |
| 5,829,561 | A | * | 11/1998 | Arhab | |
| 6,293,380 | B1 | * | 9/2001 | Arhab | 192/3.29 |
| 6,332,516 | B1 | * | 12/2001 | Arhab | 192/3.29 |
| 6,446,779 | B1 | * | 9/2002 | Yabe | 192/213 |
| 6,571,929 | B2 | * | 6/2003 | Tomiyama et al. | 192/213.1 |
| 6,866,129 | B2 | * | 3/2005 | Tomiyama | 192/3.29 |
| 6,938,744 | B2 | * | 9/2005 | Tomiyama | 192/3.29 |
| 7,207,888 | B2 | * | 4/2007 | Verhoog et al. | 464/67.1 |
| 2008/0093188 | A1 | * | 4/2008 | Verhoog | 192/3.29 |
| 2009/0229938 | A1 | * | 9/2009 | Kombowski et al. | 192/3.29 |
| 2011/0031083 | A1 | * | 2/2011 | Matsuoka et al. | 192/3.29 |

FOREIGN PATENT DOCUMENTS

| JP | 2002-048217 A | 2/2002 |
|---|---|---|
| JP | 2006-009918 | 1/2006 |

* cited by examiner

*Primary Examiner* — Gregory Binda
*Assistant Examiner* — Matthieu Setliff
(74) *Attorney, Agent, or Firm* — Global IP Counselors, LLP

(57) ABSTRACT

The lock-up device includes a piston, an output rotary member, a plurality of elastic members, a support member, and a retaining plate. The piston is supported rotatably with respect to the input rotary member and movably in the axial direction. The elastic members elastically link the piston and the output rotary member in the rotational direction. The support member has an outer peripheral support component to support the outer peripheral side of the elastic members. The retaining plate has a fixed component that is fixed to the piston, and a radial support component that supports the outer peripheral support component in the radial direction.

19 Claims, 9 Drawing Sheets

LOCK-UP DEVICE

CROSS-REFERENCE TO RELATED APPLICATIONS

This application claims priority to Japanese Patent Application No. 2008-009631 filed on Jan. 18, 2008. The entire disclosure of Japanese Patent Application No. 2008-009631 is hereby incorporated herein by reference.

BACKGROUND OF THE INVENTION

1. Field of the Invention

The present invention relates to a lock-up device for a fluid torque transmission apparatus, and more particularly relates to a lock-up device to transmit torque from an input rotary member and to absorb and to damp torsional vibration.

2. Background Information

A fluid torque transmission apparatus transmits the torque of an input member to an output member, and an example of such an apparatus is a torque converter.

A torque converter is an apparatus that has three kinds of bladed wheels (an impeller, a turbine, and a stator) in its interior, and transmits torque via a hydraulic fluid on the inside. The impeller is fixed to a front cover serving as an input-side rotary body. The turbine is disposed opposite the impeller in a fluid chamber. When the impeller turns, the hydraulic fluid flows from the impeller to the turbine, rotates the turbine, and outputs torque.

This type of torque converter often includes a lock-up device that transmits torque from the input rotary member to the output rotary member and absorbs and damps torsional vibration that is transmitted from the input rotary member to the output rotary member.

This lock-up device is disposed in a space between the turbine and the front cover, and directly transmits torque from the front cover to the turbine by mechanically linking the front cover and the turbine.

This torque converter usually has a disk-shaped piston, a retaining plate, an elastic member, and a driven plate. The disk-shaped piston is configured to be pressed against the front cover. The retaining plate is fixed to the outer peripheral part of the piston. The elastic member is supported elastically deformably by the retaining plate. The driven plate supports the ends of the elastic member in the rotational direction. The driven plate is fixed to the turbine shell, for example.

When the lock-up device is in a linked state, the torque is transmitted from the front cover to the piston, and is further transmitted through the elastic member to the turbine. Also, with the elastic linking mechanism of the lock-up device, the elastic member is compressed in the rotational direction between the retaining plate and the driven plate, and absorbs and damps torsional vibration.

This lock-up device is sometimes provided with a support member that supports the outer peripheral part of the elastic member in the radial direction as shown in Japanese Laid-Open Patent Application 2002-48217.

With the lock-up device described in JP2002-48217, movement of the support member in the axial direction and the radial direction is restricted by the retaining plate. More specifically, part of the retaining plate extends to the transmission side of the support member in the axial direction, and when the support member moves in the axial direction to the transmission side, the retaining plate restricts the axial direction movement of the support member by coming into contact with the support member. Therefore, the retaining plate may end up having a complex shape, which drives up its manufacturing costs.

In view of the above, it will be apparent to those skilled in the art from this disclosure that there exists a need for an improved lock-up device. This invention addresses this need in the art as well as other needs, which will become apparent to those skilled in the art from this disclosure.

SUMMARY OF THE INVENTION

It is an object of the present invention to reduce the manufacturing cost of a lock-up device for a fluid torque transmission apparatus.

A lock-up device according to a first aspect of the present invention is used in a fluid torque transmission apparatus provided between an engine and a transmission. The lockup device transmits torque from an input rotary member and absorbs and damps torsional vibration. The lock-up device has a piston, an output rotary member, a plurality of elastic members, a support member, and a retaining plate. The piston is supported rotatably with respect to the input rotary member and movably in the axial direction. The elastic members elastically link the piston and the output rotary member in the rotational direction. The support member has an outer peripheral support component to support the outer peripheral side of the elastic members. The retaining plate has a fixed component that is fixed to the piston, and a radial support component that supports the outer peripheral support component in the radial direction.

When the lock-up device links the input rotary member and the output rotary member, the piston moves to the engine side along with a change in hydraulic pressure, and comes into contact with the input rotary member. When the piston comes into contact with the input rotary member, torque is transmitted from the input rotary member to the piston. The torque transmitted to the piston is then transmitted through the retaining plate and the elastic members to the output rotary member.

Since the radial support component here supports the support member in the radial direction, there is less need to bend the radial support component and the fixed component of the retaining plate in the axial direction. Consequently, the shape of the retaining plate can be simplified. Thus, the cost of manufacturing the lock-up device can be reduced.

A lock-up device according to a second aspect of the present invention is the lock-up device of the first aspect, wherein the support member has a protrusion that protrudes from the outer peripheral support component toward the inner peripheral side. The protrusion restricts movement of the support member to the transmission side by coming into contact with the face of the retaining plate on the engine side.

Here, because the protrusion comes into contact with the retaining plate, movement of the support member to the transmission side can be restricted.

A lock-up device according to a third aspect of the present invention is the lock-up device of the second aspect, wherein the protrusion is disposed between the piston and the retaining plate of the support member, and is able to come into contact with the piston when the support member moves to the engine side.

Here, movement of the support member to the engine side can be restricted.

A lock-up device according to a fourth aspect of the present invention is the lock-up device of the second or third aspect, wherein the radial support component is disposed between two of the elastic members that are adjacent to one another in the circumferential direction. The protrusion is provided corresponding to the radial support component.

Here, centrifugal force acts on the elastic members when the fluid torque transmission apparatus rotates, and this presses the elastic members to the support member side. Therefore, the forces acting during rotation are different in the portion supporting the elastic members and the portion not supporting the elastic members, resulting in instability. With the present invention, however, since the protrusion is provided corresponding to the radial support component disposed between two elastic members, the portion where the elastic members are not disposed is subjected to greater centrifugal force than the portion supporting the elastic members. Accordingly, the difference between the force during rotation that acts on the portion supporting the elastic members and the force during rotation that acts on the portion not supporting the elastic members can be reduced, providing a better balance in the circumferential direction during rotation.

A lock-up device according to a fifth aspect of the present invention is the lock-up device of any of the first to fourth aspects, wherein the radial support component is disposed on the engine side of the outer peripheral support component.

A lock-up device according to a sixth aspect of the present invention is the lock-up device of any of the second to fifth aspects, wherein the support member further has a movement restrictor that restricts movement of the elastic members to the transmission side.

Here, movement of the elastic members in the axial direction to the transmission side is restricted by the movement restrictor.

A lock-up device according to a seventh aspect of the present invention is the lock-up device of the sixth aspect, wherein, in a state in which the protrusion is in contact with the face of the retaining plate on the engine side, the axial direction spacing between the piston and the movement restrictor of the support member is greater than the diameter of the elastic members.

Here, in a state in which the elastic members are in contact with the protrusion hitting the retaining plate, a gap is formed between the elastic members and the movement restrictor. Accordingly, the elastic members and the movement restrictor are prevented from being worn down.

A lock-up device according to an eighth aspect of the present invention is the lock-up device according to the sixth or seventh aspect, wherein the movement restrictor of the support member has a restricting portion that extends from the transmission-side end of the outer peripheral support component toward the inner peripheral side, and a reinforcing portion that protrudes from the restricting portion to the transmission side.

Here, the strength of the movement restrictor in the axial direction is increased by the reinforcing portion that protrudes from the restricting portion to the transmission side.

A lock-up device according to a ninth aspect of the present invention is the lock-up device as defined in any of the first to eighth aspects, wherein the retaining plate further has a rotation restrictor that restricts rotation of the output rotary member.

Here, rotation of the output rotary member can be restricted by the retaining plate.

A lock-up device according to a tenth aspect of the present invention is the lock-up device of the ninth aspect, wherein the rotation restrictor is a portion provided so as to extend from the retaining plate to the transmission side, and restricts rotation of the output rotary member by coming into contact with the output rotary member.

With the lock-up device pertaining to the present invention, the manufacturing costs can be reduced by simplifying the shape of the retaining plate.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

1. Basic Configuration of Torque Converter

Figure 1:
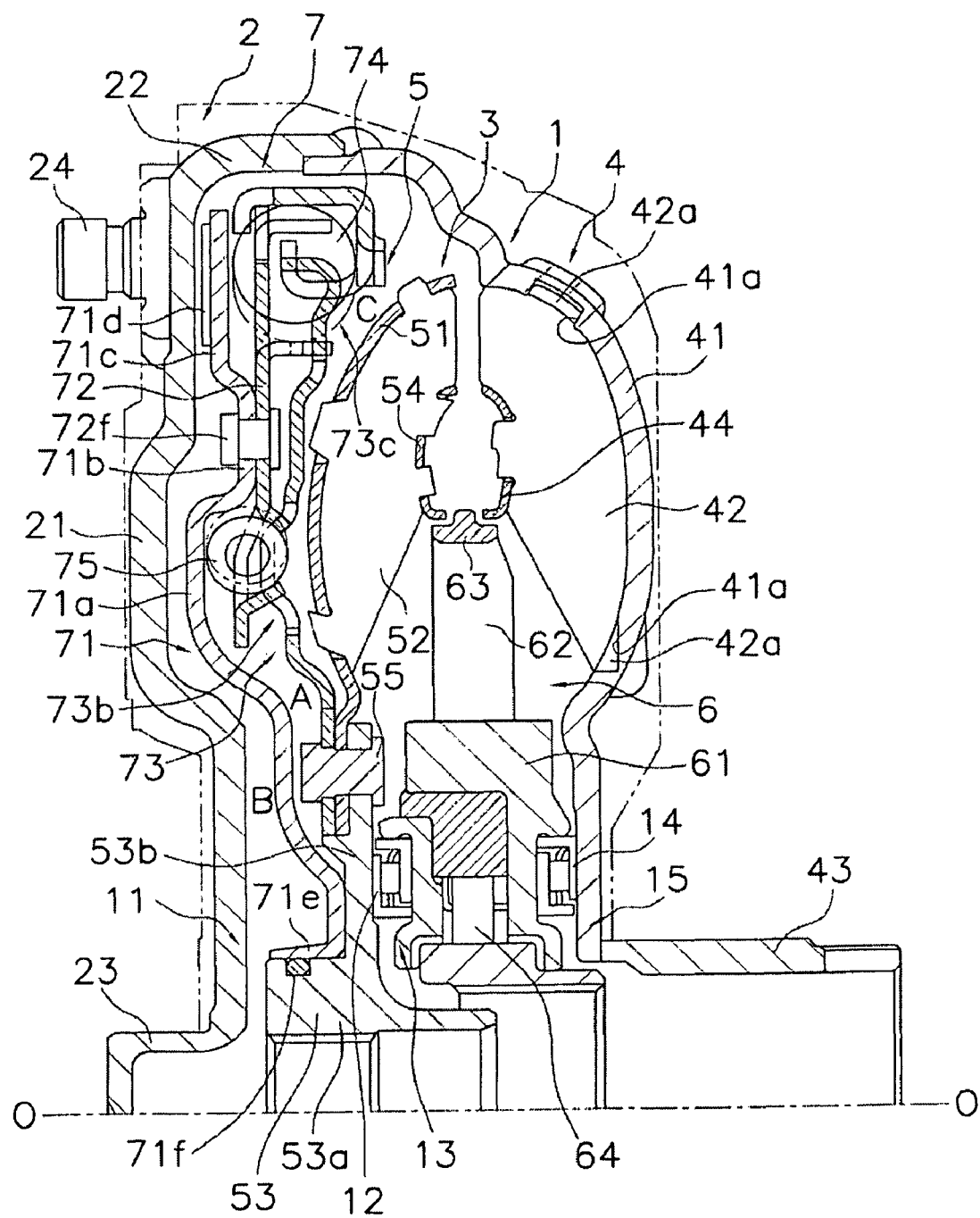
FIG. 1 is a view of a simplified vertical cross section of a torque converter according to a preferred embodiment of the present invention.

FIG. 1 is a view of a simplified vertical cross section of a torque converter 1 (fluid torque transmission apparatus) according to a preferred embodiment of the present invention. The torque converter 1 is a device to transmit torque from the crankshaft of an engine to the input shaft of a transmission. The engine (not shown) is disposed on the left side in FIG. 1, and the transmission (not shown) is disposed on the right side. The O-O line in FIG. 1 is the rotational axis of the torque converter 1.

The torque converter 1 has a front cover 2 (input rotary member), an impeller 4, a turbine 5, a stator 6, and a lock-up device 7. The impeller 4, the turbine 5, and the stator 6 form a torus-shaped hydraulic chamber 3. The lock-up device 7 that is a characteristic portion of the present invention will be described in detail below.

The front cover 2 is a member to which torque is inputted through a flexible plate (not shown). The front cover 2 is disposed on the engine side, and has an annular component 21 and a cylindrical portion 22 that extends from the outer peripheral edge of the annular component 21 toward the transmission side.

A center boss 23 is fixed by welding to the inner peripheral end of the front cover 2. The center boss 23 is a cylindrical member that extends in the axial direction, and is inserted into a center hole of the crankshaft.

A flexible plate (not shown) is fixed by a plurality of bolts 24 to the engine side of the front cover 2. This flexible plate is a thin disk-shaped member, and serves to transmit torque and to absorb bending vibration transmitted from the crankshaft to the main body of the torque converter 1.

The outer peripheral edge of an impeller shell 41 of the impeller 4 is fixed by welding to the distal end on the transmission side of the cylindrical portion 22 formed on the outer peripheral edge of the annular component 21. The front cover 2 and the impeller 4 form a fluid chamber that is filled with hydraulic fluid.

The impeller 4 mainly has the impeller shell 41, an impeller plate 42 fixed in the interior thereof, and an impeller hub 43 fixed to the inner peripheral part of the impeller shell 41.

The impeller shell 41 is disposed on the transmission side of the front cover 2 so as to be opposite the front cover 2, and a fixing recess 41a to fix the impeller plate 42 is formed in a face on the inner peripheral side. The impeller plate 42 is a sheet-shaped member, and is the portion on which the hydraulic fluid presses. On the outer peripheral side and the inner peripheral side of the impeller plate 42 is formed a convex component 42a that can be disposed in the fixing recess 41a of the impeller shell 41. An annular impeller core 44 is disposed on the turbine 5 side of this impeller plate 42. The impeller hub 43 is a cylindrical member that extends from the inner peripheral end of the impeller shell 41 to the transmission side.

The turbine 5 is disposed inside the fluid chamber and opposite the impeller 4 in the axial direction. The turbine 5 mainly has a turbine shell 51, a plurality of turbine plates 52, and a turbine hub 53 fixed to the inner peripheral part of the turbine shell 51. The turbine shell 51 is a substantially disk-shaped member. The turbine plates 52 are sheet-shaped members fixed to a face on the impeller 4 side of the turbine shell 51. A turbine core 54 is disposed on the impeller 4 side of the turbine plates 52 so as to be opposite the impeller core 44.

The turbine hub 53 is disposed in the inner peripheral part of the turbine shell 51, and has a cylindrical component 53a that extends in the axial direction, and a disk component 53b that extends from the cylindrical component 53a toward the outer periphery. The inner peripheral part of the turbine shell 51 is fixed by a plurality of rivets 55 to the disk component 53b of the turbine hub 53. A spline that engages with an input shaft is formed in the inner peripheral part of the cylindrical component 53a of the turbine hub 53. This allows the turbine hub 53 to rotate integrally with the input shaft.

The stator 6 is a mechanism that adjusts the flow of hydraulic fluid returning to the impeller 4 from the turbine 5. The stator 6 is a member produced integrally by forging, and is preferably made of a plastic, an aluminum alloy, or the like. The stator 6 mainly has an annular stator carrier 61, a plurality of stator plates 62 provided to the outer peripheral face of the stator carrier 61, and a stator core 63 provided on the outer peripheral side of the stator plates 62. The stator carrier 61 is supported by a cylindrical fixing shaft (not shown) via a one-way clutch 64.

The above-mentioned impeller shell 41, the turbine shell 51, and the stator carrier 61 form the torus-shaped hydraulic chamber 3 inside the fluid chamber. An annular space between the front cover 2 and the hydraulic chamber 3 is ensured within the fluid chamber.

A plastic member (not shown in the figures) is disposed between the inner peripheral part of the front cover 2 and the cylindrical component 53a of the turbine hub 53, and a first port 11 through which the hydraulic fluid can communicate in the radial direction is formed in this plastic member 10. The first port 11 allows a fluid path provided inside the input shaft to communicate with a space between the turbine 5 and the front cover 2. Also, a first thrust bearing 12 is disposed between the turbine hub 53 and the inner peripheral part of the stator 6, and a second port 13 through which the hydraulic fluid can communicate in the radial direction is formed in this first thrust bearing 12. A second thrust bearing 14 is disposed between the stator 6 and the impeller 4 in the axial direction, and a third port 15 through which the hydraulic fluid can communicate in the radial direction is formed in this second thrust bearing 14. The ports 11, 13, and 15 independently allow the supply and discharge of hydraulic fluid.

2. Structure of Lock-Up Device

The role of the lock-up device 7 is to transmit torque from the crankshaft of the engine, and to absorb and to damp torsional vibration. As shown in FIG. 1, the lock-up device 7 is disposed in the space between the turbine 5 and the front cover 2, and is a mechanism that mechanically links these two when necessary. The lock-up device 7 is disposed in a space A between the front cover 2 and the turbine 5 in the axial direction. The lock-up device 7 is disposed so as to divide the space A roughly in the axial direction. We will call the space between the front cover 2 and the lock-up device 7 the first hydraulic chamber B, and call the space between the lock-up device 7 and the turbine 5 the second hydraulic chamber C.

Figure 2:
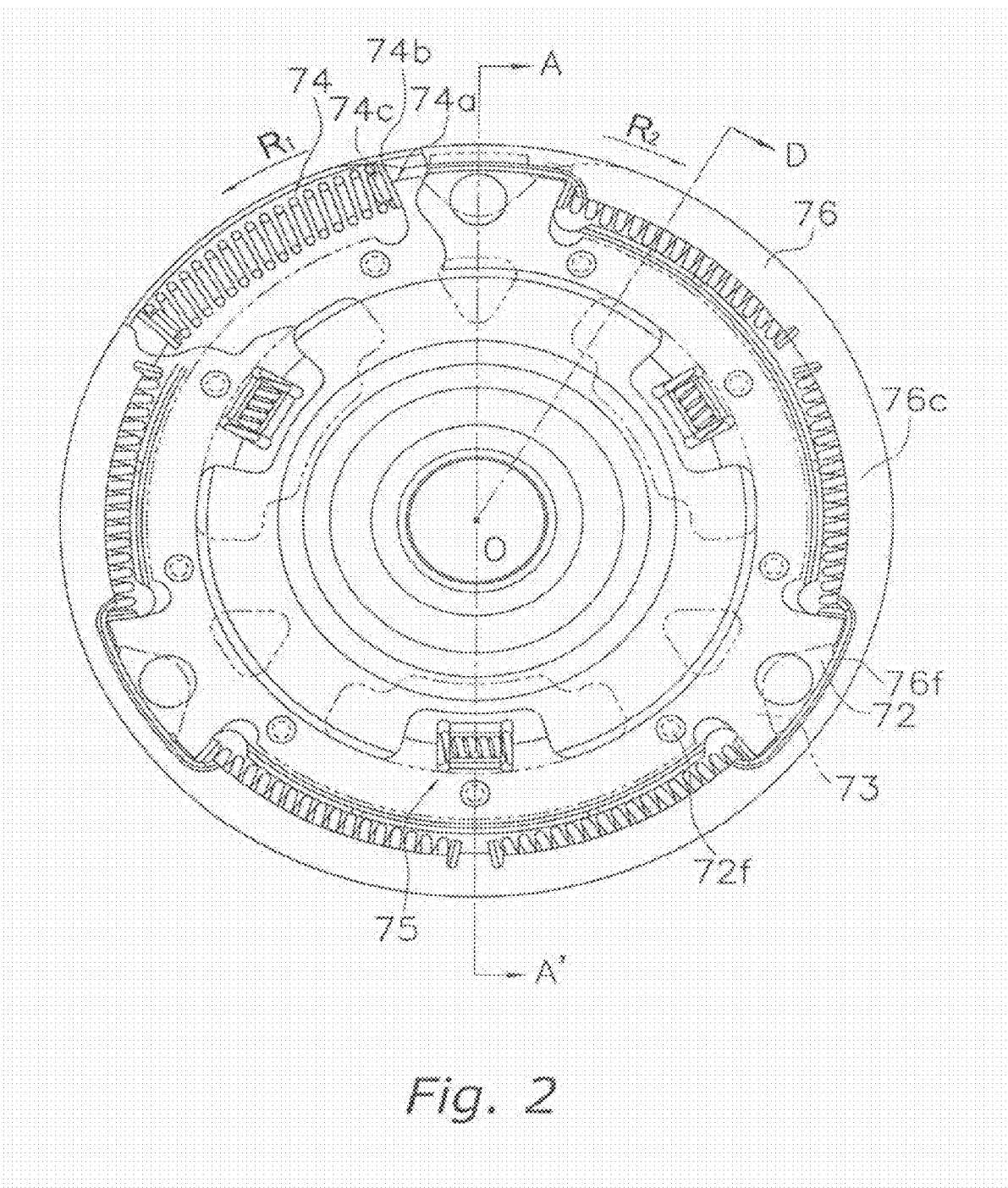
FIG. 2 is a plan view of a lock-up device of the torque converter as seen from the transmission side.
Figure 3:
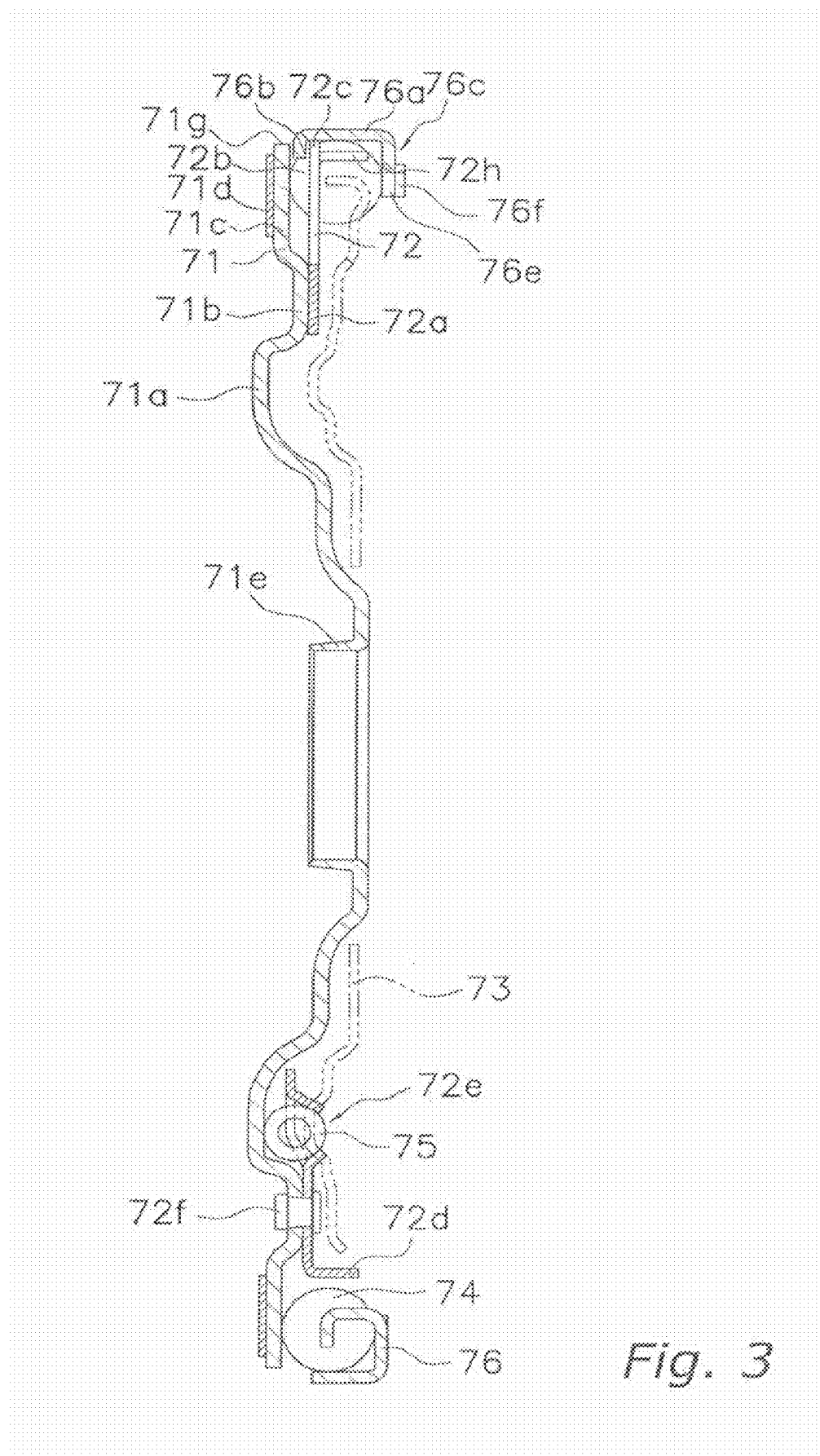
FIG. 3 is a view of a cross section of the lock-up device taken along the A-A' line in FIG. 2.
Figure 4:
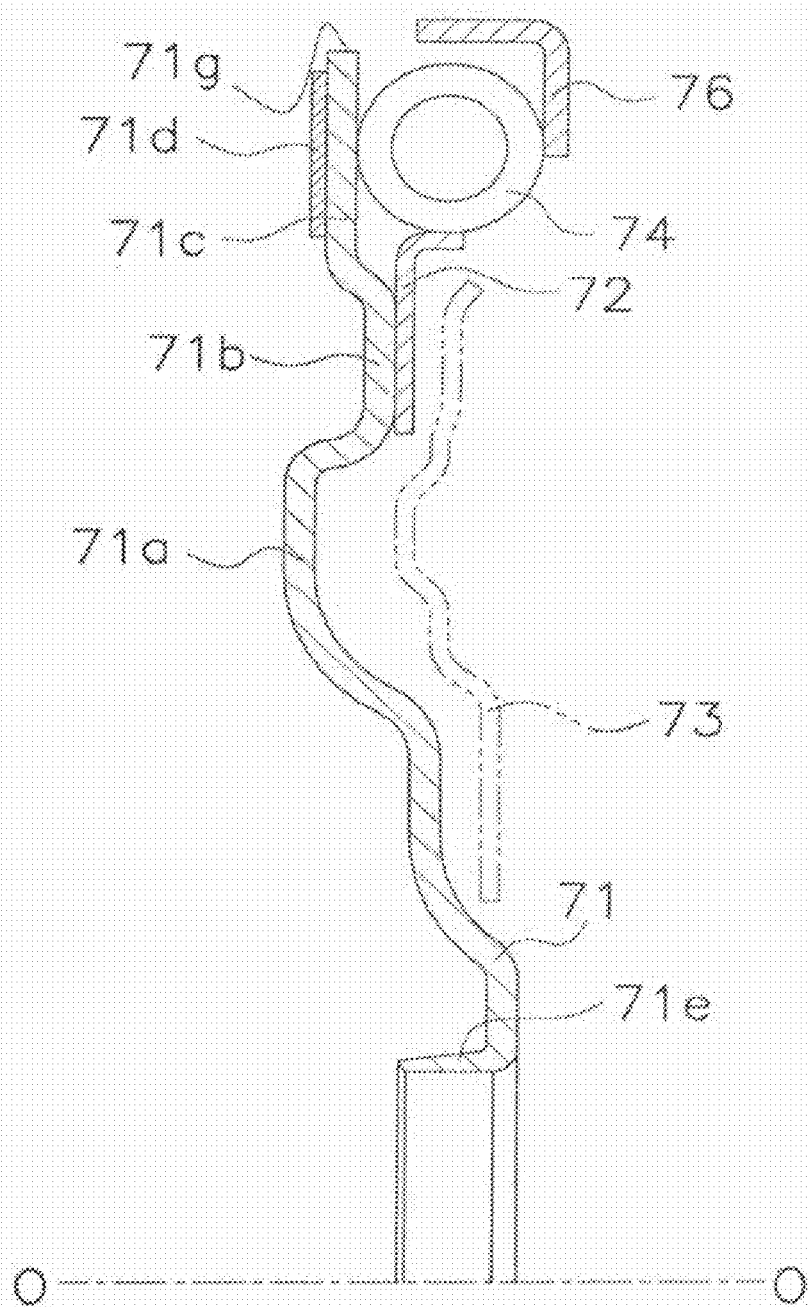
FIG. 4 is a view of a cross section of the lock-up device taken along the O-D line in FIG. 2.
Figure 5:
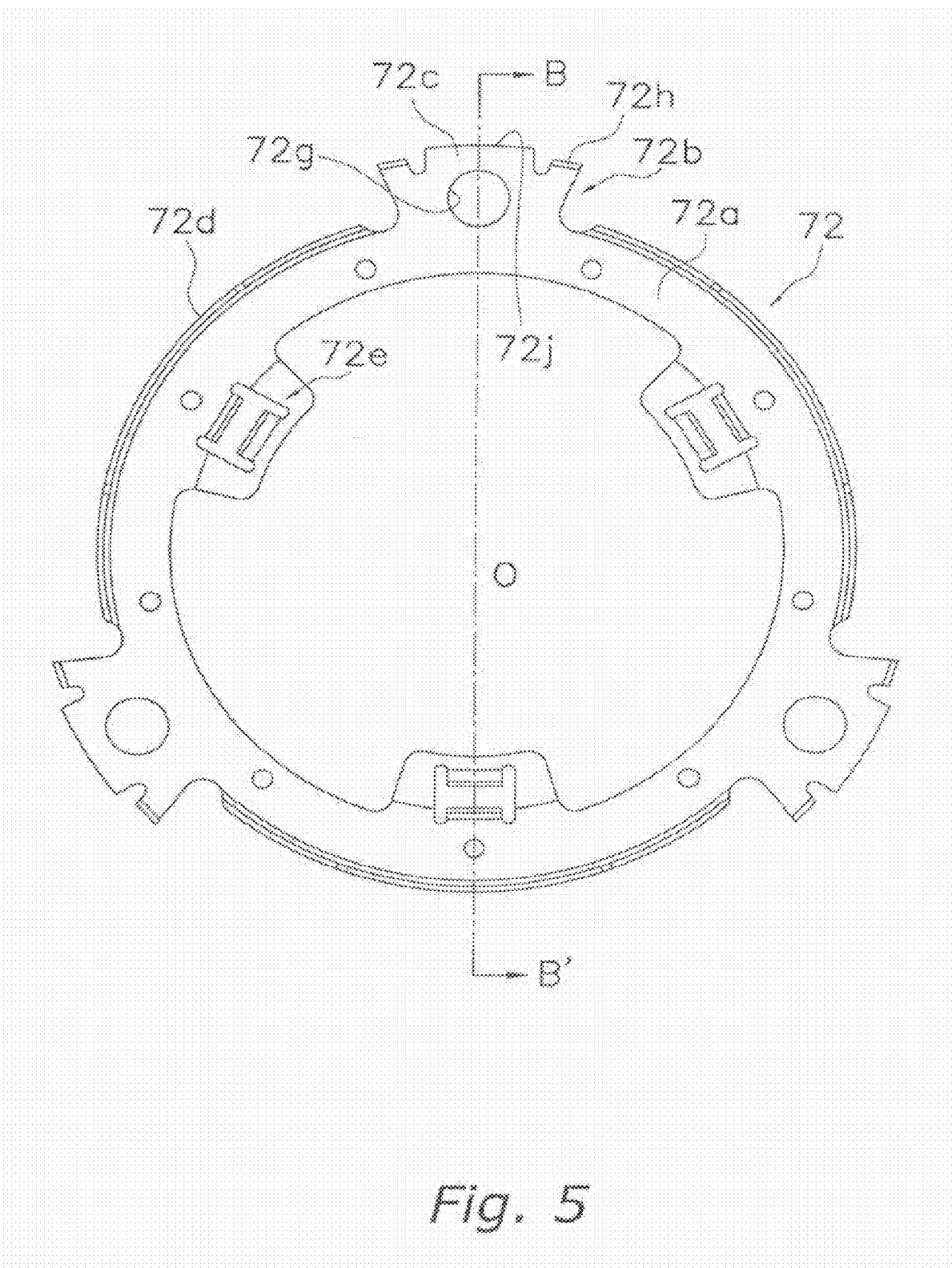
FIG. 5 is a plan view of the retaining plate of the lock-up device.
Figure 6:
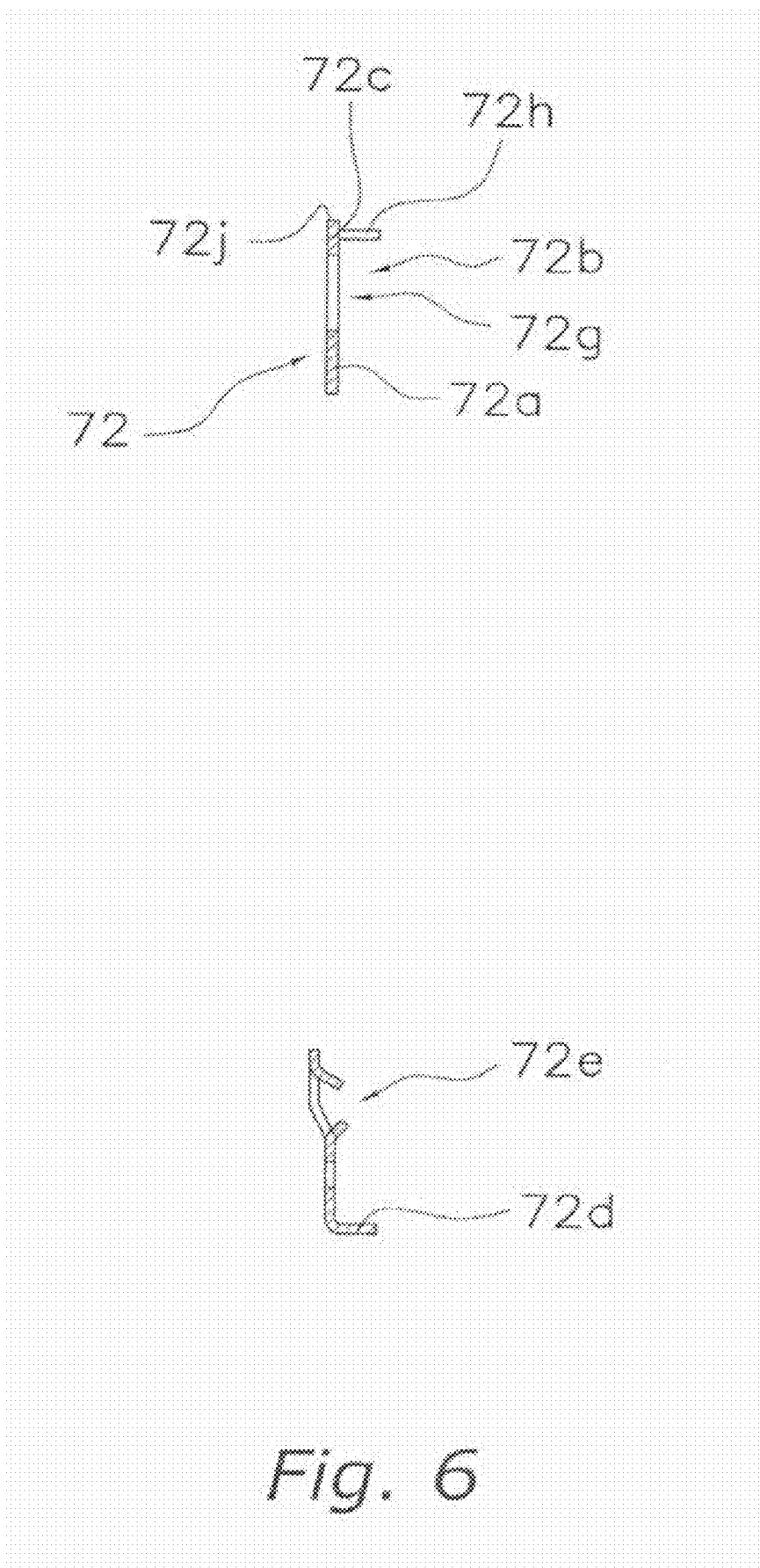
FIG. 6 is a view of a cross section of the retaining plate taken along the B-B' line in FIG. 5.
Figure 8:
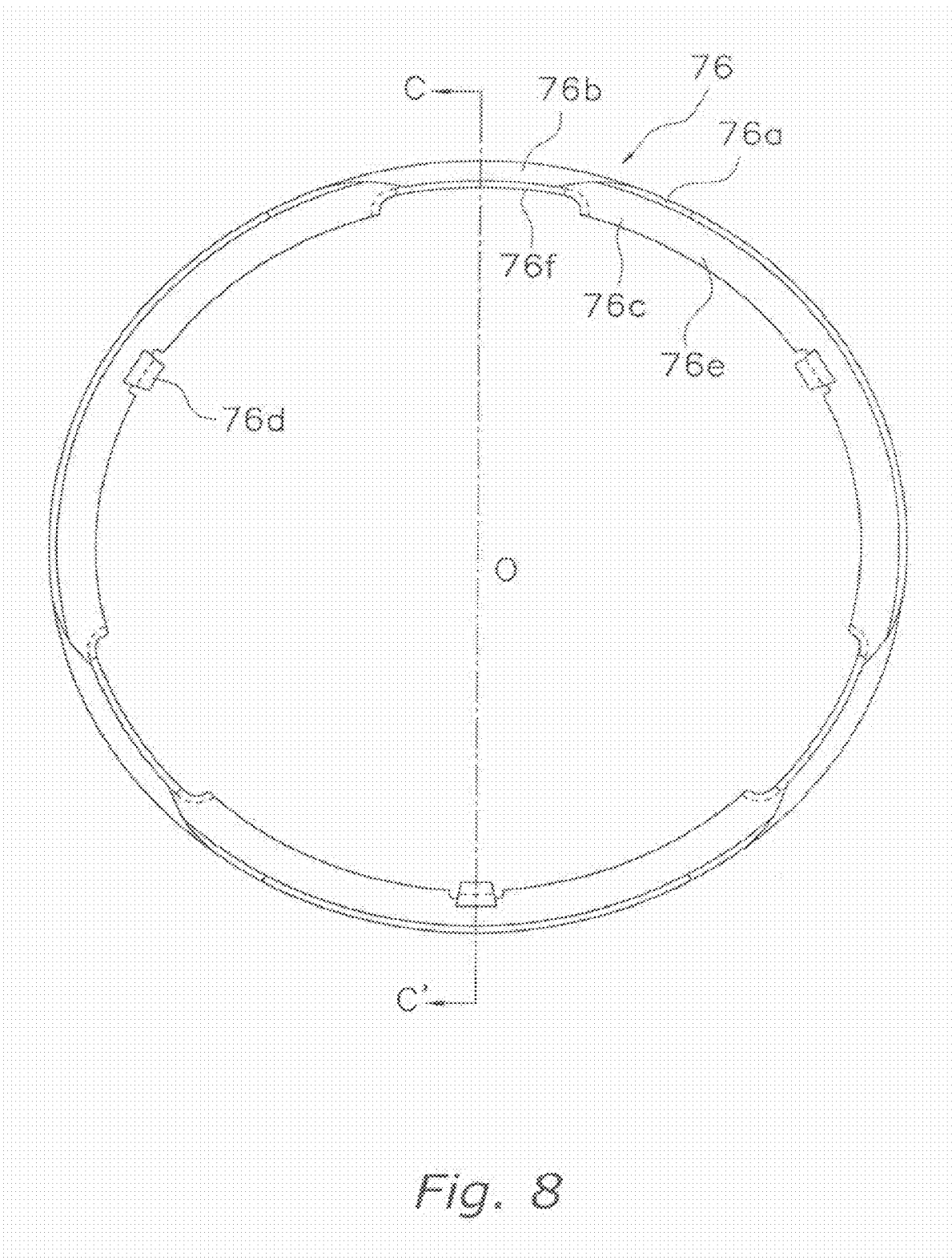
FIG. 8 is an elevational view of a support member of the lock-up device.
Figure 9:
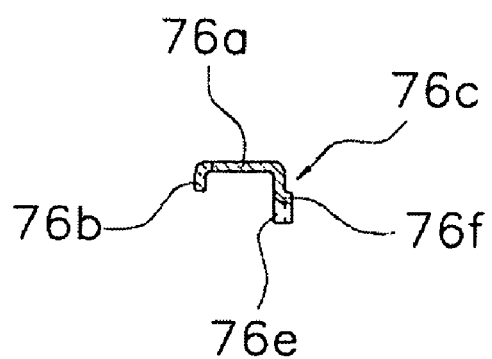
FIG. 9 is a view of a cross section of the support member taken along the C-C' line in FIG. 8.
Figure 9:
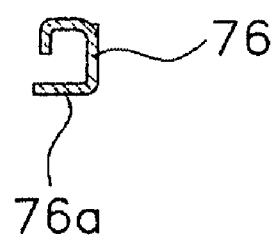

As seen in FIGS. 1 and 2, the lock-up device 7 functions as a clutch and an elastic linking mechanism, and mainly has a piston 71, a retaining plate 72, a driven plate 73 (serving as the output rotary member), a plurality of large torsion springs 74 (elastic members), a plurality of small torsion springs 75, and a support member 76. FIG. 2 is an elevational view of the lock-up device 7 as seen from the transmission side, FIG. 3 is a view of a cross section along the A-A' line in FIG. 2, and FIG. 4 is a view of a cross section along the O-D line in FIG. 2. FIG. 5 is an elevational view of the retaining plate 72, and FIG. 6 is a view of a cross section taken along the B-B' line in FIG. 5. FIG. 8 is an elevational view of the support member 76, and FIG. 9 is a view of a cross section taken along the C-C' line in FIG. 8.

As seen in FIG. 1, the piston 71 is a member that engages and disengages the clutch, and also functions as an input member in the lock-up device 7 (elastic linking mechanism). The piston 71 is disposed rotatably with respect to the crankshaft of the engine. The piston 71 is a disk-shaped member with a circular hole formed in its center. The outer end 71g of the piston 71 (see FIG. 3) extends to the radial position of the outer peripheral edge 72j of the retaining plate 72 (see FIG. 5) (the outer peripheral edge of the outer peripheral protrusions 72c discussed below).

Referring again to FIG. 1, the piston 71 extends over the entire radius within the space A, so as to divide the space A roughly in the axial direction. As shown in FIGS. 3 and 4, a recess 71a that recedes toward the engine side is formed in the substantially center portion of the piston 71 in the radial direction. As shown in FIGS. 1 and 3, part of the small torsion springs 75 is disposed in the recess 71a.

A sunken portion 71b that sinks toward the transmission is formed in the piston 71 on the outer peripheral side of the recess 71a, and a flat portion 71c that is perpendicular to the axial direction is formed further to the outer peripheral side of the sunken portion 71b. A friction facing 71d is provided to the face on the engine side of this flat portion 71c. The portion of the front cover 2 opposite the friction facing 71d is formed flat, and the clutch function of the lock-up device 7 is realized by the flat portion 71c of the front cover 2 and the friction facing 71d of the piston 71.

An inner peripheral cylindrical component 71e that extends to the engine side in the axial direction is formed around the inner peripheral edge of the piston 71. The inner peripheral cylindrical component 71e is supported by the outer peripheral face of the turbine hub 53. The piston 71 is able to move in the axial direction, and is able to come into contact with the front cover 2. Also, an annular seal ring 71f that hits the inner peripheral face of the inner peripheral cylindrical component 71e is provided to the outer peripheral part of the turbine hub 53 (see FIG. 1). This seal ring 71f forms a seal in the axial direction around the inner peripheral edge of the piston 71.

The retaining plate 72 is an annular member as shown in FIG. 5, and is preferably made of metal. Also, as shown in FIGS. 5 and 6, the retaining plate 72 preferably has a fixed component 72a, three supports 72b, the outer peripheral protrusions 72c (radial support components), rotation restrictors 72d, and spring housings 72e.

The fixed component 72a is a portion formed in a substantially annular shape, and is fixed by a plurality of rivets 72f in the sunken portion 71b of the piston 71 (see FIG. 3). Referring to FIGS. 1 and 5, the supports 72b are portions supporting the circumferential direction ends of the large torsion springs 74, and are formed so as to protrude from the fixed component 72a farther to the outer peripheral side. Also, the supports 72b are provided to be spaced regularly apart in the circumferential direction, and are portions protruding so that the width gradually increases from the fixed component 72a toward the outer peripheral side.

A circular hole 72g is formed substantially in the center of each of the supports 72b in order to reduce weight. The supports 72b also have plate-shaped circumferential support components 72h that extend to the transmission side at the circumferential direction end of the outer peripheral part. These circumferential support components 72h are able to come into contact with the circumferential direction ends of the large torsion springs 74. The circumferential support components 72h are portions extending in the axial direction so as to be able to support entirely the large torsion springs 74 in the axial direction. The outer peripheral protrusions 72c are portions protruding farther to the outer peripheral side from the supports 72b, and are provided on the outer peripheral side of the circular holes 72g. The outer peripheral protrusions 72c are disposed between two of the large torsion springs 74 that are adjacent in the circumferential direction.

Figure 7:
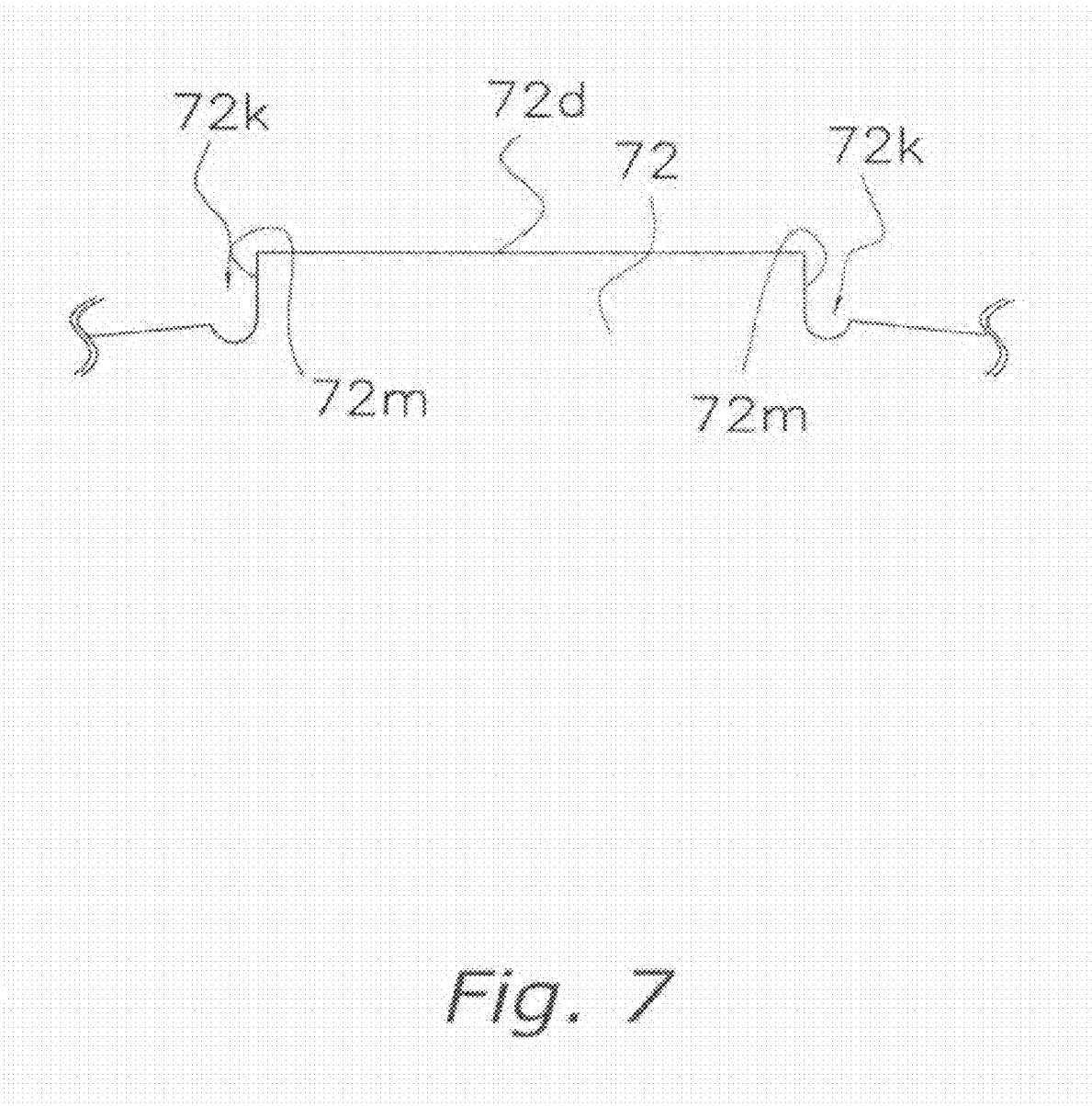
FIG. 7 is a detailed enlarged view a rotation restrictor of the retaining plate.

The rotation restrictors 72d are portions restricting the rotation of the driven plate 73 by coming into contact with the driven plate 73. As shown in FIG. 7, the rotation restrictors 72d protrude from the outer peripheral edge of the fixed component 72a so as to extend to the transmission side, and protrude beyond the peripheral portion. Notches 72k are formed on either side of the rotation restrictors 72d in the circumferential direction, and are able to come into contact with the driven plate 73 at the circumferential side faces 72m of the rotation restrictors 72d. FIG. 7 is a detail enlargement of a rotation restrictor 72d of the retaining plate 72.

Referring to FIGS. 1, 5, and 6, the spring housings 72e are portions that are able to accommodate the small torsion springs 75, and are provided so as to protrude from the fixed component 72a toward the inner peripheral side. Also, as shown in FIG. 5, the spring housings 72e are disposed regularly spaced apart in the circumferential direction, and are disposed between two of the supports 72b that are adjacent to one another in the circumferential direction.

Referring to FIG. 1, the driven plate 73 is an annular member made from sheet metal. The inner peripheral part of the driven plate 73 is fixed to the turbine hub 53 by the plurality of rivets 55. In substantially the radial center of the driven plate 73 are formed three window holes 73b in which the small torsion springs 75 are disposed. The outer peripheral ends of the driven plate 73 are bent toward the engine side. A flat portion 73c is formed on the driven plate 73. As seen in FIGS. 1 and 3, this flat portion 73c restricts the rotation of the driven plate 73 by coming into contact with the rotation restrictors 72d of the retaining plate 72.

The large torsion springs 74 serve to transmit power between the driven plate 73 and the piston 71 via the retaining plate 72, and to absorb and to damp torsional vibration, and are disposed on the transmission side of the piston 71. In this embodiment, six of the large torsion springs 74 are arranged in the circumferential direction. As shown in FIG. 2, spring seats 74a are disposed at both ends of the large torsion springs 74 in the circumferential direction. These spring seats 74a each have a disk-shaped portion 74b that supports a circumferential direction end of a large torsion spring 74, and a protruding support 74c that protrudes from the disk-shaped portion 74b in the circumferential direction. The spring seats 74a are supported by the retaining plate 72.

The small torsion springs 75 serve to transmit power between the retaining plate 72 and the driven plate 73, and to absorb and to damp torsional vibration, and are disposed on the inner peripheral side of the large torsion springs 74.

The support member 76 supports the outer peripheral side of the large torsion springs 74. Also, as shown in FIGS. 8 and 9, the support member 76 has outer peripheral supports (outer peripheral support component) 76a, three protrusions 76b, movement restrictors 76c, and center components 76d.

The outer peripheral supports 76a are portions that support the outer peripheral side of the large torsion springs 74, and as shown in FIG. 3, are disposed on the outer peripheral side of the large torsion springs 74. The outer peripheral supports 76a are also cylindrical portions that extend in the axial direction. Furthermore, the outer peripheral supports 76a are supported in the radial direction by the distal ends of the outer peripheral protrusions 72c of the retaining plate 72. The outer peripheral supports 76a are disposed on the transmission side in the axial direction of the outer peripheral protrusions 72c.

The protrusions 76b are provided at the engine-side ends of the outer peripheral supports 76a, and protrude from the inner peripheral face of the outer peripheral supports 76a to the inner peripheral side. As seen in FIG. 8, the protrusions 76b are trapezoidal in shape, such that the width gradually decreases toward the inner peripheral side. The protrusions 76b are disposed regularly spaced apart in the circumferential direction. Also, as shown in FIGS. 3 and 5, the protrusions 76b are portions disposed between the outer end 71g of the piston 71 and the outer peripheral edge 72j of the retaining plate 72 in the axial direction. If the support member 76 attempts to move to the transmission side in the axial direction, the protrusions 76b come into contact with the faces on the engine side of the outer peripheral protrusions 72c, which restricts the movement of the support member 76. If the support member 76 attempts to move further to the engine side in the axial direction, the protrusions 76b come into contact with the face on the transmission side of the outer end 71g of the piston 71, which restricts the movement of the support member 76 to the engine side. The protrusions 76b are disposed corresponding to the outer peripheral protrusions 72c. That is, they are disposed at locations where the large torsion springs 74 are not disposed in the circumferential direction.

The movement restrictors 76c are portions that restrict the movement of the large torsion springs 74 to the transmission side, and extend from the transmission-side ends of the outer peripheral supports 76a toward the inner peripheral side. Also, the movement restrictors 76c have restricting portions 76e and reinforcing portions 76f. The movement restrictors 76c are portions that restrict the movement of the large torsion springs 74 by coming into contact with the large torsion springs 74 when the large torsion springs 74 attempt to move to the transmission side. The restricting portions 76e are portions that extend from the transmission-side ends of the outer peripheral supports 76a toward the inner peripheral side. In a state in which the protrusions 76b are touching the retaining plate 72, the axial direction spacing between the movement restrictors 76c and the piston 71 is greater than the diameter of the large torsion springs 74. That is, a gap is formed between the movement restrictors 76c and the large torsion springs 74. The reinforcing portions 76f serve to increase the strength of the movement restrictors 76c, and protrude from the restricting portions 76e to the transmission side.

As shown in FIG. 2, the center components 76d are portions that are able to support the circumferential ends of the large torsion springs 74, and are disposed between two adjacent large torsion springs 74 in the circumferential direction. The center components 76d are portions that extend from the movement restrictors 76c toward the engine side.

3. Operation of Torque Converter

Referring initially to FIG. 1, immediately after the engine is started, hydraulic fluid is supplied from the first port 11 and the third port 15 into the torque converter 1, and hydraulic fluid is discharged from the second port 13. The hydraulic fluid supplied from the first port 11 flows through the space between the piston 71 and the front cover 2 (the first hydraulic chamber B) to the outer peripheral side, and flows through the space between the piston 71 and the turbine 5 (the second hydraulic chamber C) into the hydraulic chamber 3.

The hydraulic fluid supplied from the third port 15 into the main body of the torque converter 1 moves to the impeller 4 side, and is moved by the impeller 4 to the turbine 5 side. The hydraulic fluid that has moved to the turbine 5 side is moved by the turbine 5 to the stator 6 side, and is supplied back to the impeller 4. This action rotates the turbine 5.

The power transmitted to the turbine 5 is transmitted to the input shaft. Power is thus transmitted between the input shaft and the crankshaft of the engine. At this point the piston 71 is separated from the front cover 2, and the torque of the front cover 2 is not transmitted to the piston 71.

4. Operation of Lock-Up Device

When the rotational speed of the torque converter 1 rises and the input shaft reaches a constant speed, the hydraulic fluid in the first hydraulic chamber B is discharged from the first port 11. As a result, a hydraulic pressure differential between the first hydraulic chamber B and the second hydraulic chamber C moves the piston 71 to the front cover 2 side, and the friction facing 71d is pressed against the flat friction face of the front cover 2. When the friction facing 71d is pressed against the front cover 2, the torque of the front cover 2 is transmitted from the piston 71, through the retaining plate 72 and the large torsion springs 74, to the driven plate 73. The torque transmitted to the driven plate 73 is then transmitted from the driven plate 73 to the turbine 5. That is, the front cover 2 is mechanically linked to the turbine 5, and the torque of the front cover 2 is outputted through the turbine 5 directly to the input shaft.

In the locked-up state mentioned above, the lock-up device 7 transmits torque. Along with torque transmission, the lock-up device 7 also absorbs and damps torsional vibration inputted from the front cover 2. More specifically, when torsional vibration is inputted from the front cover 2 to the lock-up device 7, the large torsion springs 74 and the small torsion springs 75 are compressed in the rotational direction between the retaining plate 72 and the driven plate 73. The large torsion springs 74 and the small torsion springs 75 thus absorb and damp torsional vibration.

5. State and Operation of Support Member and Large Torsion Springs

Referring now to FIGS. 1 and 3, when the support member 76 moves in the axial direction to the transmission side, the protrusions 76b of the support member 76 come into contact with the face on the engine side of the retaining plate 72. Thus, the support member 76 is restricted to a specific position in its movement to the transmission side (the position where the protrusions 76b of the support member 76 come into contact with the retaining plate 72). When the support member 76 moves to the transmission side, the protrusions 76b of the support member 76 come into contact with the face on the transmission side of the piston 71. Thus, the support member 76 is restricted to moving from a specific position to the transmission (the position where the protrusions 76b of the support member 76 come into contact with the piston 71). Also, the large torsion springs 74 come into contact with the outer peripheral supports 76a when attempting to move to the outer peripheral side under centrifugal force. Accordingly, movement of the large torsion springs 74 to the outer peripheral side is restricted. When the large torsion springs 74 move in the axial direction to the transmission side, they come into contact with the movement restrictors 76c of the support member 76. These movement restrictors 76c prevent the large torsion springs 74 from moving beyond a specific position to the transmission side (the position where the large torsion springs 74 come into contact with the movement restrictors 76c).

Also, when the retaining plate 72 and the driven plate 73 are rotating relative to one another, the rotation restrictors 72d of the retaining plate 72 come into contact with the driven plate 73. When the rotation restrictors 72d of the retaining plate 72 come into contact with the driven plate 73, the rotation of the driven plate 73 relative to the retaining plate 72 is restricted.

6. Operation During Assembly

When the support member 76, the large torsion springs 74, and so forth are being assembled in the torque converter 1, first the retaining plate 72 is disposed on the inner peripheral side of the support member 76 from the engine side in FIG. 1. Then the large torsion springs 74 are disposed so as to sandwich the outer peripheral protrusions 72c of the retaining plate 72 in the circumferential direction. After this, the piston 71 is fixed to the fixed component 72a of the retaining plate 72 with rivets 72f, and disposed inside the torque converter 1.

7. Advantageous Effect of Support Member a) Referring to FIGS. 1, 3, and 5, since the outer peripheral edge 72j of the retaining plate 72 supports the outer peripheral supports 76a of the support member 76 in the radial direction, the structure of the retaining plate 72 and the support member 76 can be simplified. This means that manufacturing costs can be reduced.

b) If the support member 76 attempts to move to the transmission side, the protrusions 76b latch the retaining plate 72 and restrict the movement of the support member 76 in the axial direction. Accordingly, movement of the support member 76 in the axial direction to the transmission side can be restricted.

c) Since the protrusions 76b are provided to the engine-side ends of the outer peripheral supports 76a, they have less effect on the outside diameter of the large torsion springs 74. This means that the outside diameter of the large torsion springs 74 can be increased, which improves the efficiency of torque transmission.

Here, the circumferential ends of the large torsion springs 74 are supported by the outer peripheral protrusions 72c of the retaining plate 72, as are the outer peripheral supports 76a of the support member 76, so there is no need to dispose a member for supporting the support member 76 laterally in the axial direction of the large torsion springs 74. Therefore, the overall size of the torque converter 1 can be reduced in the axial direction. Also, if the size of the torque converter 1 remains the same, the large torsion springs 74 can have a larger diameter than in a torque converter a member that is disposed to support the support member 76 laterally in the axial direction of the large torsion springs 74. This affords greater latitude in design.

d) Since the protrusions 76b of the support member 76 are disposed between the piston 71 and the retaining plate 72 in the axial direction, movement of the support member 76 to the engine side can be restricted.

e) Since the movement restrictors 76c of the support member 76 do not come into contact with the large torsion springs 74 in a state in which the protrusions 76b are latched to the retaining plate 72, the large torsion springs 74 and the movement restrictors 76c can be prevented from being worn down. Also, extra room can be left around the large torsion springs 74, allowing the large torsion springs 74 to operate more smoothly.

f) The protrusions 76b of the support member 76 are disposed corresponding to the outer peripheral protrusions 72c in the circumferential direction. That is, they are provided at locations where the large torsion springs 74 are not disposed in the circumferential direction. Therefore, overall balance can be improved during rotation.

g) Since the reinforcing portions 76f are provided to the support member, the strength of the movement restrictors 76c of the support member 76 can be increased.

GENERAL INTERPRETATION OF TERMS

In understanding the scope of the present invention, the term "comprising" and its derivatives, as used herein, are intended to be open ended terms that specify the presence of the slated features, elements, components, groups, integers, and/or steps, but do not exclude the presence of other unstated features, elements, components, groups, integers, and/or steps. The foregoing also applies to words having similar meanings such as the terms, "including," "having," and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of a equipped with the present invention. Accordingly, these terms, as utilized to describe the present invention should be interpreted relative to a fluid torque transmission apparatus equipped with the present invention as normally used. Finally, terms of degree such as "substantially," "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A lock-up device that is used in a fluid torque transmission apparatus provided between an engine and a transmission, to transmit torque from an input rotary member and to absorb and to damp torsional vibration, comprising:
   a piston being supported rotatably with respect to the input rotary member and movably in the axial direction;
   an output rotary member;
   a plurality of elastic members elastically linking the piston and the output rotary member in the rotational direction;
   a support member having an outer peripheral support component being configured to support the outer peripheral side of the elastic members; and
   a retaining plate having
      a fixed component being fixed to the piston, and
      a radial support component being configured at the outermost part in a radial direction of the retaining plate being in contact with the outer peripheral support component, the radial support component supporting the outer peripheral support component in the radial direction to prevent the support member from moving in the axial direction.

2. The lock-up device according to claim 1, wherein the support member has a protrusion that protrudes from the outer peripheral support component toward the inner peripheral side, and
   the protrusion restricts movement of the support member to a transmission side by coming into contact with the face of the retaining plate on an engine side.

3. The lock-up device according to claim 2, wherein the protrusion is disposed between the piston and the retaining plate of the support member, and is configured to contact with the piston when the support member moves to the engine side.

4. The lock-up device according to claim 3, wherein
   the radial support component is disposed between two of the plurality of elastic members that are adjacent to one another in the circumferential direction, and
   the protrusion is provided corresponding to the radial support component.

5. The lock-up device according to claim 2, wherein
   the radial support component is disposed between two of the plurality of elastic members that are adjacent to one another in the circumferential direction, and
   the protrusion is provided corresponding to the radial support component.

6. The lock-up device according to claim 5, wherein the radial support component is disposed on the engine side of the outer peripheral support component.

7. The lock-up device according to claim 2, wherein the support member further has a movement restrictor that restricts movement of the elastic members to the transmission side.

8. The lock-up device according to claim 7, wherein,
   axial direction spacing between the piston and the movement restrictor of the support member is greater than the diameter of the elastic members in a state in which the protrusion is in contact with the face of the retaining plate on the engine side.

9. The lock-up device according to claim 8, wherein
the movement restrictor of the support member has a restricting portion that extends from the transmission-side end of the outer peripheral support component toward the inner peripheral side, and a reinforcing portion that protrudes from the restricting portion to the transmission side.

10. The lock-up device according to claim 7, wherein
the movement restrictor of the support member has a restricting portion that extends from the transmission-side end of the outer peripheral support component toward the inner peripheral side, and a reinforcing portion that protrudes from the restricting portion to the transmission side.

11. The lock-up device according to claim 1, wherein
the radial support component is disposed on the engine side of the outer peripheral support component.

12. The lock-up device according to claim 11, wherein
the support member further has a movement restrictor that restricts movement of the elastic members to the transmission side.

13. The lock-up device according to claim 12, wherein,
axial direction spacing between the piston and the movement restrictor of the support member is greater than the diameter of the elastic members in a state in which the protrusion is in contact with the face of the retaining plate on the engine side.

14. The lock-up device according to claim 13, wherein
the movement restrictor of the support member has a restricting portion that extends from the transmission-side end of the outer peripheral support component toward the inner peripheral side, and a reinforcing portion that protrudes from the restricting portion to the transmission side.

15. The lock-up device according to claim 14, wherein
the retaining plate further has a rotation restrictor that restricts rotation of the output rotary member.

16. The lock-up device according to claim 15, wherein
the rotation restrictor is a portion provided to extend from the retaining plate to the transmission side, and restricts rotation of the output rotary member by coming into contact with the output rotary member.

17. The lock-up device according to claim 12, wherein
the movement restrictor of the support member has a restricting portion that extends from the transmission-side end of the outer peripheral support component toward the inner peripheral side, and a reinforcing portion that protrudes from the restricting portion to the transmission side.

18. The lock-up device according to claim 1, wherein
the retaining plate further has a rotation restrictor that restricts rotation of the output rotary member.

19. The lock-up device according to claim 18, wherein
the rotation restrictor is a portion provided to extend from the retaining plate to the transmission side, and restricts rotation of the output rotary member by coming into contact with the output rotary member.

* * * * *